United States Patent [19]

Kawamura

[11] Patent Number: 4,926,204
[45] Date of Patent: May 15, 1990

[54] PHOTOMETRIC APPARATUS FOR A CAMERA

[75] Inventor: Masaharu Kawamura, Kanagawa, Japan

[73] Assignee: Canon Kabushiki Kaisha, Tokyo, Japan

[21] Appl. No.: 393,115

[22] Filed: Aug. 4, 1989

Related U.S. Application Data

[63] Continuation of Ser. No. 319,876, Mar. 1, 1989, abandoned, which is a continuation of Ser. No. 140,101, Dec. 31, 1987, abandoned.

[30] Foreign Application Priority Data

Jan. 12, 1987 [JP] Japan .................. 62-004592

[51] Int. Cl.$^5$ .............................................. G03B 3/00
[52] U.S. Cl. ............................... 354/400; 354/402
[58] Field of Search ............... 354/400, 402, 403, 441, 354/442

[56] References Cited

U.S. PATENT DOCUMENTS

| | | | |
|---|---|---|---|
| 4,506,150 | 3/1985 | Ogasawara | 354/402 |
| 4,609,274 | 9/1986 | Iwashita et al. | 354/442 |
| 4,614,417 | 9/1986 | Hata et al. | 354/403 |
| 4,693,581 | 9/1987 | Yamaki et al. | 354/400 |
| 4,705,382 | 11/1987 | Mukai et al. | 354/402 |
| 4,723,139 | 2/1988 | Ogasawara | 354/402 |

Primary Examiner—Russell E. Adams
Attorney, Agent, or Firm—Fitzpatrick, Cella, Harper & Scinto

[57] ABSTRACT

A camera is provided with automatic focusing circuitry which is arranged to begin to operate to drive a focusing motor, in response to an operation performed on a shutter release button, to bring the motor to a stop upon detection of an in-focus state and to produce an in-focus signal. Photometric circuitry is arranged to begin to operate in response to the operation on the release button to obtain a photometric value by detecting the luminance of an object to be photographed, and to be capable of renewing the photometric value in response to a change in the luminance of the object. The photometric value is locked in response to the generation of the in-focus signal. Control circuitry means which controls the photometric apparatus in response to cancellation of the operation on the release button. The control circuitry unlocks the photometric value kept at the photometric apparatus and allows the photometric apparatus to operate to obtain another photometric value by detecting the luminance of the object once more within a predetermined period of time.

12 Claims, 4 Drawing Sheets

PHOTOMETRIC APPARATUS FOR A CAMERA

This application is a continuation of application Ser. No. 319,876, filed Mar. 1, 1989, which is a continuation of Ser. No. 140,101, filed Dec. 31, 1987, both now abandoned.

BACKGROUND OF THE INVENTION

1. Field of the Invention

This invention relates to an automatic focusing camera having an automatic exposure locking function.

2. Description of the Related Art

An automatic focusing (hereinafter referred to as AF) camera which is arranged to have a photometric value locked for an automatic exposure (hereinafter referred to as AE) after completion of AF adjustment and to readily lock the automatic exposure to a specific object by a single process of operation has been disclosed in Japanese patent application Laid-Open No. SHO 58-120225. Meanwhile, many patent applications have been filed, including U.S. Pat. No. 4,429,974, for cameras which are of the kind performing photometric and computing actions together with a displaying action when a shutter button is pushed down to its first stroke position and are arranged to have the photometric, computing and displaying actions allowed to continue by means of a timer arrangement (hereinafter referred to as photometric timer function). The camera with the photometric timer function, however, has the following shortcoming: If an AE lock function remains operative after an AF lock action during the photometric timer period, it is impossible to obtain a photometric value for any object that is other than a main object. This presents a problem, because:

In photographing under ordinary conditions, an apposite exposure is generally attainable from a photometric value obtained at the time of focusing. However, in the event of an object having extremely varied degrees of luminance, it would become impossible to make an apposite exposure as desired on the basis of a photometric value which is obtained through the process of focusing and is held in store, if the object moves or if the luminance thereof changes. It is therefore necessary, for an exposure which is highly apposite to the intention of the photographer, to take into consideration some additional photometric value that is obtained for objects other than the main object. However, if light measurement in real time is impossible during the photometric timer period like in the case of cameras of the above stated kind, it is hardly possible to find the luminance of different objects existing within a picture plane by variously changing the composition of a picture. The photographer is then at a loss to know whether an exposure first determined is good or requires some correction. The conventional cameras having the photometric timer function thus put the photographer to great inconvenience.

SUMMARY OF THE INVENTION

It is an object of this invention to provide a camera which, although it is of the kind automatically locking a photometric value obtained when an in-focus state is attained by automatic focusing, is arranged to enable the photographer to perform an additional photometric operation in real time as necessary and thus to carry out photographing as desired.

The above and other objects and features of the invention will become apparent from the following detailed description of embodiments thereof taken in connection with the accompanying drawings.

DETAILED DESCRIPTION OF THE PREFERRED EMBODIMENTS

To begin with, terms to be used in the following description are defined as follows: A term "AF lock" is an abbreviation for an automatic focusing lock mode. The word "AF" means actions to be performed to detect by means of a distance measuring device a degree of deviation from an in-focus position of an object located within a distance measuring region and to automatically obtain an in-focus state by shifting in the focusing direction a lens which contributes to the focusing action by means of a drive source such as a motor. Generally the term "AF lock" means keeping the lens in its position obtained when an in-focus state is obtained and, after that, the lens is not allowed to move from that position even when the object within the distance measuring region moves (or when the photographer changes the photographing field) and the change in the object's position is detected by the distance measuring device. This term "AF lock" applies not only to the above stated case of locking the lens position in response to an in-focus signal but also to a case where the lens position is arranged to be kept unvarying either in response to an operation performed on an external operation switch or in accordance with information on a set lens position (to have the lens focused on an object located at a preset distance after the lens is shifted by a driving force of the drive source).

The term "AE lock" is an abbreviation for an automatic exposure lock mode. The word "AE" means an exposure made by automatically controlling an aperture value and/or a shutter time value on a preset condition (normally for an apposite exposure) according to the luminance of an object in carrying out a photographing operation in a program mode, a shutter priority mode, an aperture priority mode, or the like. Generally, the "AE lock" is arranged in such a way as to permit no change in the photographing condition such as an aperture value and/or a shutter time value determined on the basis of a measured degree of object's luminance, even if a change takes place in the luminance of the object, after that condition is determined through a photometric action on the object.

Figure 1:
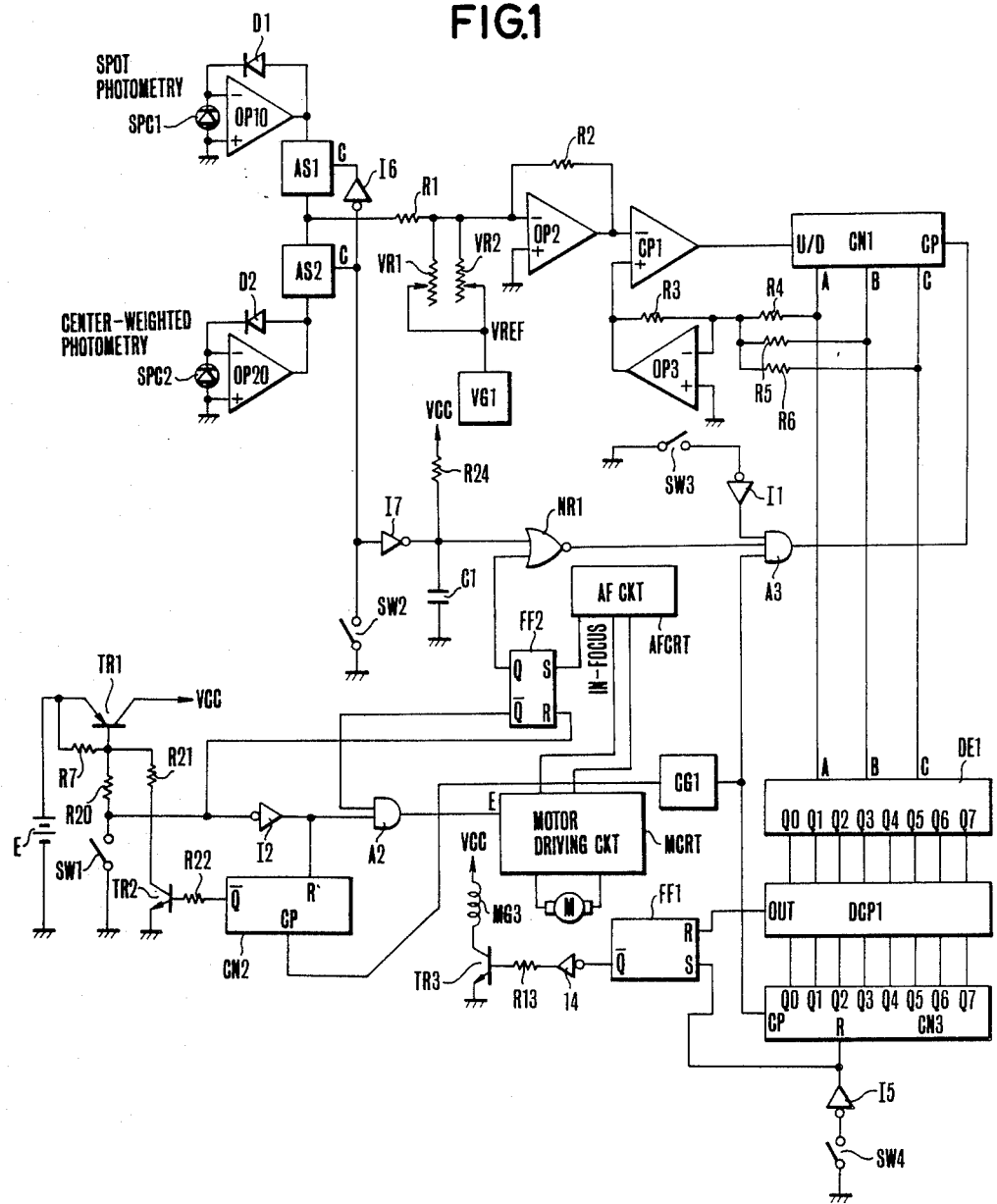
FIG. 1 is a circuit diagram showing a first embodiment of this invention.

FIG. 1 shows in a circuit diagram a camera arranged according to this invention as an embodiment thereof. Referring to FIG. 1, a light receiving element SPC1 is provided for partial photometry (or spot photometry). The element SPC1 is connected between the input terminals of an operational amplifier (hereinafter referred to as OP amp) OP10 which is arranged to have a high impedance input. A diode D1 is provided for logarithmic compression and is connected to a feedback loop of the OP amp OP10. The light receiving element SPC1, the OP amp OP10 and the diode D1 jointly form a partial (or spot) photometric circuit, which is arranged to produce an output obtained by logarithmically compressing a degree of luminance measured by partial photometry. Another light receiving element SPC2 is provided for center-weighted photometry. The element SPC2 is connected between the input terminals of an OP amp OP20. A diode D2 which is provided for logarithmic compression is connected in the feedback loop of the OP amp OP20. The light receiving element SPC2, the OP amp OP20 and the diode D2 jointly form a center-weighted photometric circuit. This circuit measures the light of almost the whole of a photographing field with importance set on the middle part thereof and is thus arranged to produce a logarithmically compressed value of luminance measured by the center-weighted photometry.

Analog switches AS1 and AS2 are arranged to be rendered conductive by a high level signal (hereinafter referred to as an H signal) when the H signal is applied to their control terminals C and to transmit the outputs of the photometric circuits to an OP amp OP2 which will be described later herein. An inverter I6 is connected between the control terminals of the analog switches AS1 and AS2. A switch SW2 is arranged to be responsive to a photometric mode change-over operation member which is not shown. These analog switches AS1, AS2 and the inverter I6 jointly form a photometric mode selection circuit.

A variable resistor VR1 is responsive to the operation of a film sensitivity value setting dial (not shown) and has its moving contact piece connected to a constant voltage source VG1 which is arranged to supply a constant voltage VREF to the resistor VR1. A variable resistor VR2 is responsive to an aperture presetting ring which is not shown. The moving contact piece of the resistor VR2 is also connected to the constant voltage source VG1 to receive the constant voltage VREF. These variable resistors VR1 and VR2 form a preset information setting circuit, which is arranged to receive voltage values corresponding to film sensitivity information SV and aperture information AV.

The OP amp OP2 is provided for computing an exposure value. A resistor R2 is connected to the feedback loop of the OP amp OP2. The negative input terminal of the OP amp OP2 is connected to the output terminals of the analog switches AS1 and AS2 via the variable resistors VR1 and VR2 and a resistor R1. The OP amp OP2 performs a computing operation according to a formula $BV+SV-AV=TV$ on the basis of the above stated preset information SV, AV and luminance information BV which is produced from the photometric circuit and is received via the analog switch and to produce a voltage inversely proportional to the APEX value TV of the shutter time as a result of the comparison.

A comparator CP1 has its negative input terminal connected to the output terminal of the OP amp OP2 and its positive input terminal to the output terminal of another OP amp OP3 which will be described later. An up-down counter CN1 has its up-down terminal U/D connected to the output terminal of the comparator CP1 and its clock terminal CP to a clock pulse generator CG1 via an AND gate A3. The up-down counter CN1 is thus arranged to up count when the output of the comparator CP1 is at a a high level and to down count when it is at a low level. Ladder resistors R4, R5 and R6 are connected to the output terminals A, B and C of the up-down counter CN1 and have resistance values which are arranged in a multiple series. An OP amp OP3 is an inverting amplifier having a resistor R3 connected to the feedback loop thereof. The comparator CP1, the counter CN1, the ladder resistors R4, R5 and R6 and the OP amp OP3 jointly form a follow-up comparison type A-D (analog-to-digital) converter, which converts the output of the OP amp OP2 into a digital value.

A storage switch SW3 is arranged to turn off in response to a shutter release action immediately before mirror uplifting. The switch SW3 is connected via an inverter I1 to the negative input terminal of an AND gate A3 and inhibits a pulse input to the counter CN1 by blocking a high level output of the AND gate A3 immediately before the mirror uplifting. An inverter I7 is connected to the switch SW2 mentioned in the foregoing. FIG. 1 further shows a resistor R24, a capacitor C1 and a NOR gate NR1 which are arranged to jointly form a delay circuit. This delay circuit is arranged to change the output level of the NOR gate NR1 from a high level to a low level after the lapse of a period of time determined by the capacitor C1 and the resistor R24 when the switch SW2 turns on. The delay time of the delay circuit is set at a value which is either equal to a length of time required for completion of the analog-to-digital conversion by the A-D converter or a little longer than that. In case that a light measuring (or photometric) mode is changed over to the AE lock mode with the switch SW2 having been turned on by the delay circuit, the arrangement described above ensures that a photometric value obtained by light measurement can be analog-to-digital (A-D) converted even after the change-over.

A 3-line-to-8-line decoder DE1 is connected to the output terminals A, B and C of the above state counter CN1. The decoder DE1 is arranged to produce a high level signal from one of its output terminals Q0 to Q7 in accordance with input information. A count switch SW4 is arranged to turn off in response to the travel of the leading curtain of a shutter. A shutter time counting counter CN3 has its reset terminal R connected via an inverter I5 to the above stated switch SW4 and is arranged to begin to count when the switch SW4 turns off. A digital comparator DCP1 is arranged to compare the content of the decoder DE1 with that of the counter CN3 and to produce a high level signal from its output terminal OUT when the outputs of the two coincide with each other. The decoder DE1, the counter CN3 and the digital comparator DCP1 form a timer circuit for counting a shutter time.

An RS flip-flop FF1 has its set terminal S connected to the above stated inverter I5 and its reset terminal R to the output terminal OUT of the digital comparator DCP1. An inverter I4 is connected to the $\bar{Q}$ output terminal of the flip-flop FF1 and is also connected via resistor R13 to the base of a transistor TR3. The transistor TR3 has its collector connected to a magnet MG3 which is provided for holding the trailing curtain of the shutter. The flip-flop FF1, the inverter I4, the transistor TR3 and the magnet MG3 jointly form a trailing shutter curtain control circuit.

Figure 2:
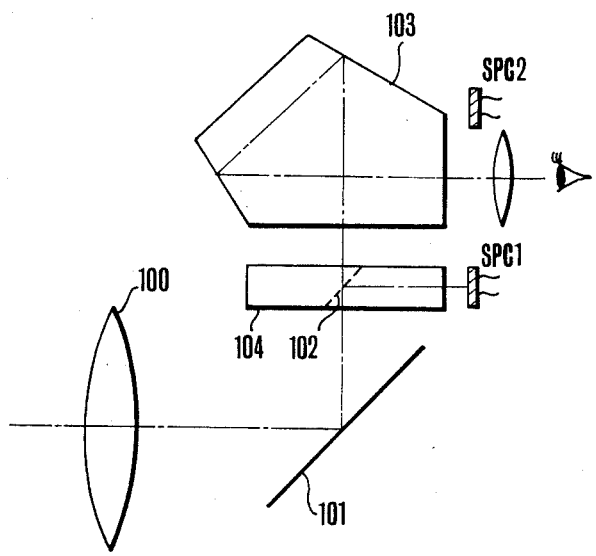
FIG. 2 shows the arrangement of a view finder photometric system of the camera embodying this invention.

FIG. 2 shows the arrangement of the light receiving element SPC1 and SPC2 of FIG. 1 as in relation to the viewfinder optical system of the camera. In FIG. 2, a reference numeral 100 denotes a photo taking lens, a numeral 101 a reflection mirror and a numeral 104 a focusing screen. A half-mirror 102 is arranged at the focusing screen 104 to guide only the light flux of the middle part of a photographing picture plane to the above stated light receiving element SPC1. A partial photometric action (spot photometry) thus can be accomplished by means of the light receiving element SPC1. The light receiving element SPC2 is disposed at a pentagonal prism 103 and is arranged to receive the whole light quantity of the focusing screen 104 for the center-weighted photometry.

Again referring to FIG. 1, a reference symbol E denotes a power source battery. A photometric switch SW1 is arranged to turn on when a shutter button is pushed to the first stroke position thereof. The switch SW1 has one terminal thereof grounded while the other terminal is connected to the base of a transistor TR1 via a resistor R20. The transistor TR1 has its collector connected to the positive electrode of the power source battery E and a resistor R7 connected between the base and the emitter thereof. When the photometric switch SW1 turns on, the transistor TR1 becomes conductive to permit the supply of the voltage Vcc of the power source battery E to each circuit.

An AF circuit AFCRT is arranged to be rendered operative by the photometric switch SW1. The AF circuit AFCRT is connected to a lens motor driving circuit MCRT. When an in-focus state is detected by the AF circuit AFCRT, the lens motor driving circuit MCRT produces an instruction via an R-S type flip-flop FF2 and an AND gate A2 for bringing to a stop the driving action of the motor M which is arranged to serve as the drive source of a device for shifting a lens used for focusing. In other words, the in-focus signal output of the AF circuit AFCRT is supplied to the set terminal S of the flip-flop FF2. The $\bar{Q}$ output of the flip-flop FF2 is arranged to be supplied to one of the input terminals of the AND gate A2. The terminal on the non-grounding side of the photometric switch SW1 is connected via an inverter I2 to the other input terminal of the AND gate A2. The output terminal of the AND gate A2 is connected to the enable terminal E of the lens motor driving circuit MCRT.

A counter CH2 is provided with a terminal CP which is arranged to receive clock pulses from a clock pulse generator CG1; an input terminal R which is connected via an inverter I2 to the photometric switch SW1; and a $\bar{Q}$ output terminal which is arranged to control an on-off action on a transistor TR2. After the photometric switch SW1 turns off, the $\bar{Q}$ output of the counter CN2 keeps the transistor TR2 in its ON state over a given period of time. Accordingly, this allows the transistor TR1 to be continuously on for a given period of time. The counter CN2 thus enables the photometric timer circuit to perform a light measuring action, a display and a computing operation after the photometric switch turns off. An inverter I7 which is arranged to invert the output of an open collector is connected to the terminal of the switch SW2 for connection to an inverter I6. The output terminal of the inverter I7 of the open collector is connected to a connecting terminal between a resistor R24 and a capacitor C1 which form a time constant circuit and is also connected to one of the input terminals of the NOR gate NR1. The NOR gate NR1 has the other input terminal thereof connected to the Q output terminal of the flip-flop FF2 and the output terminal thereof to the input terminal of an AND gate A3. The output of the NOR gate NR1 is thus arranged to control the counting action of the counter CN1 which is performed according to the output of the clock pulse generator CG1.

Next, the operation of the camera which is arranged according to this invention as described above is described with reference to FIGS. 1 and 2.

In the case of normal photographing: When the photometric switch SW1 turns on in response to a first stroke operation on the shutter release button, the transistor TR1 turns on. This allows the voltage Vcc of the battery E to be supplied to each of the applicable circuit elements. When the photometric change-over switch SW2 turns off, the analog switch AS2 turns on to render the center-weighted photometric circuit operative. The output of the center-weighted photometric circuit, i.e. a photometric value obtained on the basis of the output of the light receiving element SPC2 is supplied via the resistor R1 to the OP amp OP2. The OP amp OP2 then performs a computing operation on the center-weighted photometry output and voltages corresponding to an aperture value and a film sensitivity value set by means of the resistors VR1 and VR2. As a result of the computation, a voltage corresponding to a shutter time value is obtained. In the meantime, the storage switch SW3 is in an ON state before a shutter release operation and, as mentioned above, the switch SW2 is in an OFF state. Therefore, the AND gate A3 is open to allow the pulses from the pulse generator CG1 to come to the counter CN1. In its initial state, the counted value of the counter CN1 is zero. The output level of the OP amp OP3 is, therefore, high. The comparator CP1 produces a high level output. The counter CN1 thus up counts. The output of the OP amp OP3 gradually decreases as the counted value of the counter CN1 increases. When the output of the OP amp OP3 exceeds that of the OP amp OP2, the output level of the comparator CP1 becomes low to bring the counter CN1 into a down count state. After the counter CN1 comes to down count, if there arises no change in the luminance condition on the part of an object to be photographed, the counter CN1 recurrently up counts and down counts every input pulse. Through these processes, a digital value of the shutter time which is obtained on the basis of the center-weighted photometry output is formed at the counter CN1.

At the same time, the AF circuit AFCRT becomes operative. After the lapse of a known accumulation time, a computing operation is carried out. The AF circuit then supplies a signal to the lens motor driving circuit MCRT for driving the motor M. The enable input terminal E of the lens motor driving circuit MCRT, in this case, is assumed to be arranged to drive the motor M only when the input is received at a high level. Assuming that the flip-flop FF2 is reset after the power supply is switched on, the automatic focus control is performed to make the output level of the $\bar{Q}$ output terminal of the flip-flop FF2 high. When the focus is adjusted with the motor M thus driven, the AF circuit AFCRT determines whether or not an in-focus state is attained. If so, the AF circuit AFCRT produces a motor halting instruction to the lens motor driving circuit MCRT for bringing the motor M to a stop. At the same time, an in-focus signal is produced to the flip-flop FF2. The flip-flop FF2 is set. Therefore, the level of the Q output of the flip-flop FF2 becomes high. The high level output makes the input level of the AND gate A3 low through the NOR gate NR1. Then, the clock pulses for the photometric A-D converter consisting of the counter CN1, etc. are stopped from being supplied. By this, the photometric value is stored. In other words, the AE lock is effected.

When the shutter release button is pushed down to its first stroke position with the camera directed to a main object to be photographed, an automatic focusing operation is performed through the above stated sequence of processes. The center-weighted photometry is thus carried out with the lens focused on the main object. Therefore, photographing can be accomplished with high probability of an apposite exposure. While the operation of the embodiment is described above as arranged for center-weighted photometry, the invention is not limited to center-weighted photometry. For example, the invention makes a evaluative (or divided) photometric arrangement such as the one disclosed in U.S. patent application Ser. No. 099,995, filed Feb. 2, 1987, more effective, because of having the object in the middle part of the picture plane.

In this condition, the output level of the Q output terminal of the flip-flop FF2 is low. Therefore, even if the focused state comes to be determined as out of focus with framing changed by the AF circuit AFCRT, the motor M for AF is never driven again by the enable terminal E of the lens motor driving circuit MCRT. After an in-focus state is attained and the AF lock is applied, this arrangement permits the photographer to readjust framing as desired, i.e. to shift the main object from the middle part to some other part of the photographing field before releasing the shutter for photographing. After an in-focus state is attained, when the finger of the photographer is detached from the release button to turn off thereby the photometric switch SW1, the embodiment operates as described below:

When the photometric switch SW1 turns on, the counter CN2 is reset through the inverter I2. Therefore, the $\overline{Q}$ output of the counter CN2 is at a high level to keep the transistor TR2 in an ON state via the resistor R22. Therefore, even when the photometric switch SW1 is turned off, the transistor TR1 is kept in the ON state by the ON state of the other transistor TR2. As a result, the power supply Vcc is still effected to each of the circuit elements. The counter CN2 is a frequency divider having a given number of dividing steps and is arranged to perform a frequency dividing action according to the clock pulses coming from the clock pulse generator CG1. In other words, when the photometric switch SW1 turns off, the counter CN2 is released from a reset state and performs the frequency dividing (or counting) action. When the frequency dividing action is performed for a given number of steps, the level of the $\overline{Q}$ output of the counter CN2 becomes low to turn off the transistor TR2. This causes the transistor TR1 also to turn off to cut off the supply of the power supply Vcc to the circuit elements. The frequency dividing time (the length of time before count-out) represents the so-called photometric timer period. After the photometric switch SW1 is turned off by the photographer, a light measuring action can be further carried on for a given length of time thereafter by virtue of this timer period. Further, the motor M for automatic focusing (AF) is arranged to be drivable only when the photometric switch SW1 is turned on. More specifically, when the photometric switch SW1 is turned off, the AND gate A2 is closed via the inverter I2. This makes the output level of the enable terminal E of the motor driving circuit MCRT low and thus brings the motor M to a halt. Further, the signal representing the turning off of the photometric switch SW1 is supplied to the reset terminal R of the flip-flop FF2 to reset the flip-flop FF2. Therefore, AF driving can be accomplished by turning the photometric switch SW1 on once again. With the flip-flop FF2 reset, the level of its Q output becomes low.

Then, since the photometric change-over switch SW2 is in an off position, the levels of both inputs to the NOR gate NR1 are low. Therefore, the AND gate A3 is opened via the NOR gate NR1 to allow the A-D converting clock pulses to come to the counter CN1. Then, the photometric circuit is again driven by rendering the A-D converter operative. In other words, with the photometric switch SW1 turned on once again, a photometric value obtained by a re-focusing action can be stored (or AE locked) in the same manner as mentioned in the foregoing.

When the photometric change-over switch SW2 is turned on, the embodiment operates as follows:

The photometry change-over switch SW2 is arranged to be turned on by a manual operation by the photographer on an operation member which is not shown but is disposed on the outside of the camera. This switch SW2 permits manual selection of a spot photometric mode. With the camera directed to a desired photographing object, when the photographer turns on the change-over switch at desired point of time (only during a period of preparation for photographing), a photometric value thus obtained at that moment can be stored by the camera. This arrangement enables the photographer to set the photometric value at any desired value that permits obtaining, for example, a highlight effect, a shadow depicting effect, etc. In this case, therefore, with respect to photometric sensitivity distribution, the spot or partial photometry is more advantageous than the center-weighted photometry.

When the photometric switch-over switch SW2 is turned on while the power supply Vcc is on (with the photometric switch on or during the photometric timer period), the analog switch AS1 turns on and the analog switch AS2 is shut down to select spot photometry. The output of the inverter I7 for the output of the open collector is inverted to cancel the short-circuit of the capacitor C1. Therefore, the time constant circuit of the resistor 24 and the capacitor C1 becomes operative. Then, after the lapse of a given period of time, the input level of the NOR gate NR1 becomes high. The AND gate A3 is closed to inhibit the A-D converting clock pulses from coming to the counter CN1. The time of this time constant is set at such a value that is long enough to allow the A-D converter to carry out A-D conversion after the photometric change-over switch SW2 is turned on to effect change-over from one photometric sensor to the other is effected.

After completion of the focusing and photometric processes, when the shutter release button is pushed further, the mirror 101 moves upward. The switch SW3 turns off immediately before the end of the upward movement of the mirror 101. This causes the inverter I1 to produce a low level output. The AND gate A3 then closes to bring the counting action of the counter CN1 to a stop and to have a digital value which corresponds to a shutter time value stored at the counter CN1.

With the shutter release button further pushed, the aperture of a diaphragm member which is not shown is stopped down and the leading shutter curtain begins to travel. With the leading shutter curtain travelling, the switch SW4 turns off to cancel the reset state of the counter CN3. The counter CN3 then begins to count.

The counted value of the counter CN3 is compared with a decode signal obtained from the digital value of the above stated counter CN1 by the decoder DE1. When the two coincide with each other, that is, when the shutter time value stored by the counter CN1 and the counted value obtained by the counter CN3 come to coincide with each other, the output terminal OUT of the comparator DCP1 produces a high level signal. This high level signal is supplied to the reset terminal R of the flip-flop FF1. This makes the level of the $\bar{Q}$ output of the flip-flop FF1 high. The inverter I4 receives it and inverts it into a low level signal. The low level signal is applied to the base of the transistor TR3 to turn off the transistor. As a result, a power supply to the magnet MG3 is cut off. This allows the trailing shutter curtain to travel to bring the exposure to an end.

Figure 3:
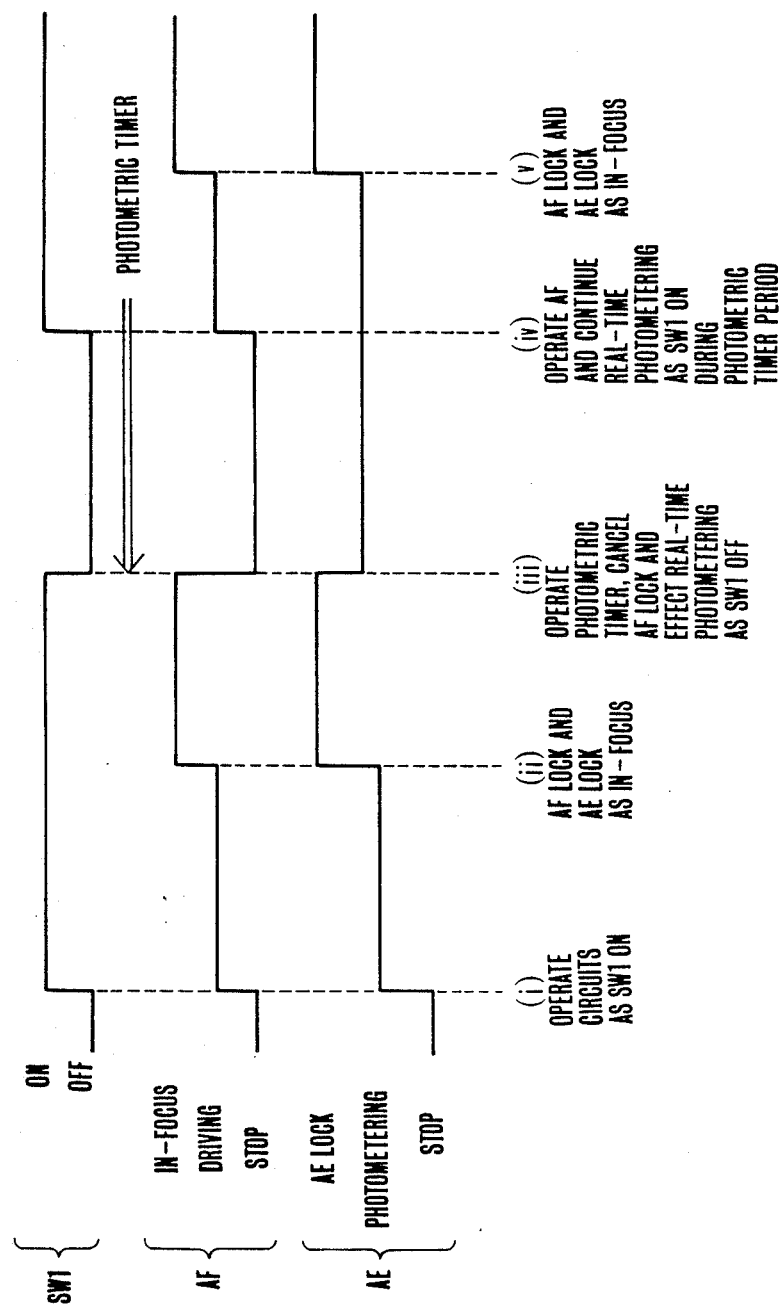
FIG. 3 is a timing chart showing the operation of the embodiment of this invention.

FIG. 3 is a time chart showing the operation of this embodiment of the invention. The instant the photometric circuit is driven with the photometric switch SW1 turned on at a point of time (i), the AF circuit AFCRT begins to operate. The AF circuit instructs the motor M driving circuit MCRT to drive the motor M. The motor begins to rotate. When the AF circuit AFCRT detects an in-focus state at a point of time (ii), the AF lock is effected. The photometric circuit is AE locked. When the photometric switch SW1 is turned off at a point of time (iii), the AF lock is cancelled. The AF circuit ceases to operate. Meanwhile, the photometric timer operates to permit a continuous photometric operation in real time.

When the photometric switch SW1 is turned on during the photometric timer period at a point of time (iv), the AF circuit becomes operative while the photometric operation continues in real time. When the AF circuit AFCRT detects an in-focus state at a point of time (v) like at the time point (ii), the AF lock is effected and the photometric circuit is AE locked.

Figure 4:
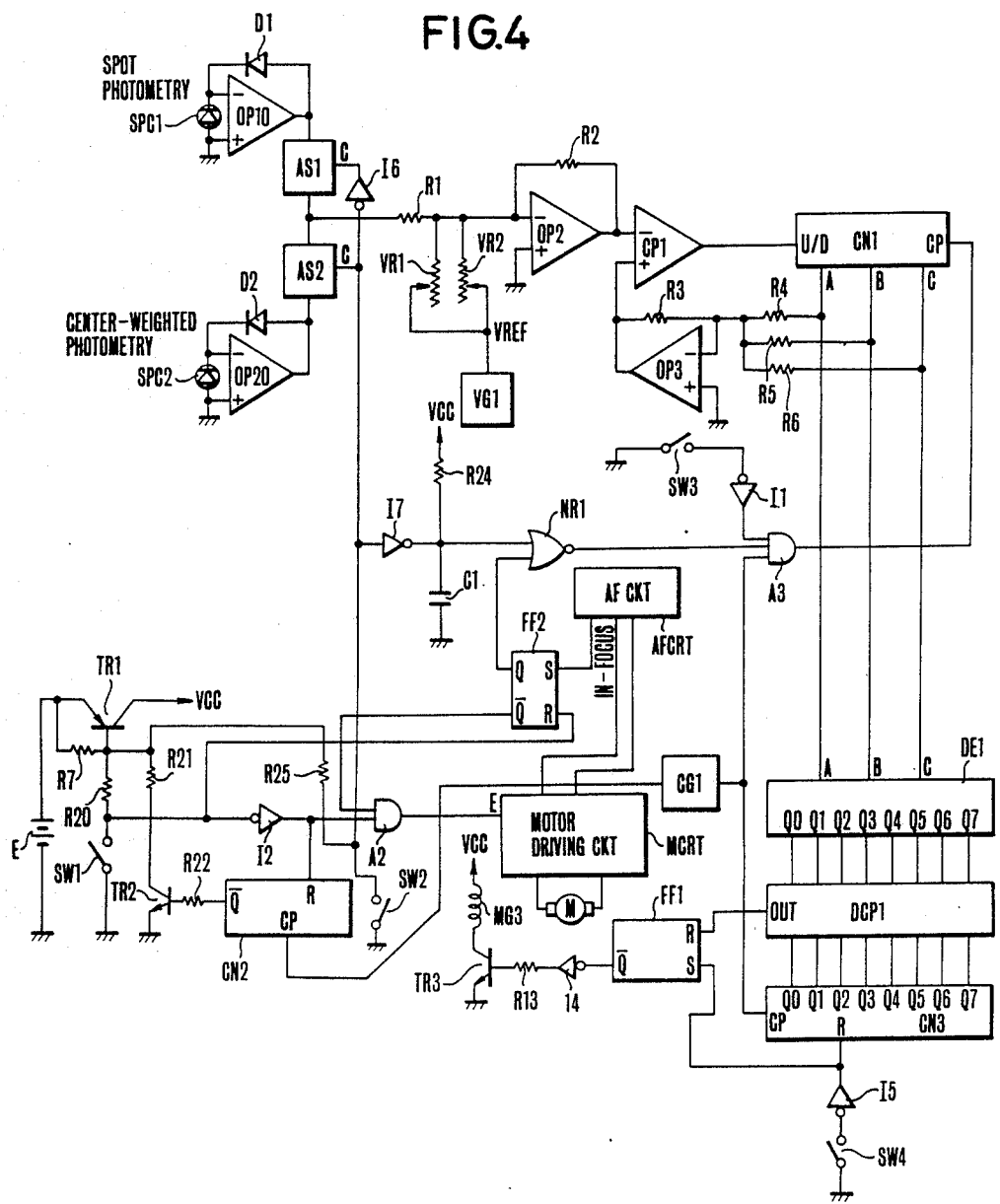
FIG. 4 is a circuit diagram showing a second embodiment of this invention.

FIG. 4 shows another embodiment of the invention. The preceding example of embodiment shown in FIG. 1 is arranged to permit the photometry change-over switch SW2 to act only when the power supply Vcc is on. Whereas, in the second embodiment shown in FIG. 4, a connection terminal between the resistors R21 and R7 is connected to a resistor R25 and further to the terminal of the photometric change-over switch SW2 on the non-grounding side thereof. Further, a connection terminal between the resistor R25 and the photometric change-over switch SW2 is connected to the input terminal of the analog switch AS2 and that of the inverter I7. The second embodiment is thus arranged to permit the power supply Vcc to be effected by turning on the photometric switch SW2. This enables the photographer to more effectively use the spot photometry.

The camera of the second embodiment begins to perform the AF and photometric actions when the shutter button is pushed to its first stroke position. After an in-focus state is attained, a photometric value obtained is stored (or AE locked). Then, when the shutter button is released from the first stroke pushing operation by detaching the finger therefrom, the photometric timer comes to operate to cancel the AE lock. In cases where the object moves or where the luminance of the object changes during the photometric timer period, therefore, light and distance measuring actions can be readily carried out once more by simply pushing the shutter button to its first stroke position. The embodiment thus enables the photographer to timely follow up the object.

While the embodiment described is arranged to perform both the AE and AF actions in response to the first stroke operation on the shutter button, the arrangement may be changed to provide a touch switch at the shutter button and to let both the AE and AF actions commence when the finger of the photographer touches the shutter button; or may be changed to let the AE action to begin when the finger touches the shutter button and let the AF action to begin when the button is pushed to its first stroke position.

What is claimed is:
1. Photometric apparatus for a camera body having a shutter release button, and adapted for use with a focus adjusting motor, said photometric apparatus comprising:
   (a) automatic focusing means arranged to begin to drive the focus adjusting motor in response to an operation performed on the shutter release button, and to bring said motor to a stop upon detection of an in-focus state, and then to generate an in-focus signal;
   (b) photometric means arranged to begin to operate in response to the operation on the shutter release button to obtain a photometric value by detecting the luminance of an object to be photographed, said photometric means being arranged to be capable of changing said photometric value in response to a change in the luminance of said object, said photometric means being further arranged to lock said photometric value in response to the generation of said in-focus signal; and
   (c) control means for controlling said photometric means in response to cancellation of the operation of the shutter release button to unlock said photometric value kept at said photometric means, said control means being arranged to enable said photometric means to obtain another photometric value by detecting once again the luminance of said object during a predetermined period of time after a previously obtained photometric value is unlocked.

2. Apparatus according to claim 1, wherein said photometric means is arranged to lock said another photometric value when said in-focus signal is generated once more within said predetermined period of time.

3. A camera according to claim 1, wherein said operation on said shutter release button is performed by pushing said button to its first stroke position.

4. Apparatus according to claim 1, wherein said photometric means is arranged to perform a light measuring action in a given cycle both before the generation of said in-focus signal and during said predetermined period of time and to always detect the luminance of said object in real time.

5. Apparatus according to claim 1, wherein said photometric means is arranged to have at least two different photometric modes; and one of said modes is selected by means of a change-over switch.

6. Apparatus according to claim 5, further comprising start means arranged to forcedly actuate said photometric means in response to the switching action of said change-over switch.

7. A camera body having a shutter release button and adapted for use with a focus adjusting motor, said camera body comprising:
   (a) automatic focusing means arranged to begin to output a signal for driving the focus adjusting motor in response to an operation performed on the shutter release button, and to output a signal for stopping the focus adjusting motor in response to detection of an in-focus state, and then to generate an in-focus signal;

(b) photometric means arranged to begin to operate in response to the operation on the shutter release button to obtain a photometric value by detecting the luminance of the object to be photographed, said photometric means being arranged to be capable of changing said photometric value in response to a change in the luminance of said object, said photometric means being further arranged to lock said photometric value in response to the generation of said in-focus signal; and (c) control means for controlling said photometric means in response to cancellation of the operation of the shutter release button to unlock said photometric value kept at said photometric means, said control mean being arranged to enable said photometric means to obtain another photometric value by detecting once again the luminance of said object during a predetermined period of time after a previously obtained photometric value is unlocked.

8. A camera body according to claim 7, wherein said photometric means is arranged to lock said another photometric value when aid in-focus signal is generated once more within said predetermined period of time.

9. A camera body according to claim 7, wherein said operation on said shutter release button is performed by pushing said button to its first stroke position.

10. A camera body according to claim 7, wherein said photometric means is arranged to perform a light measuring action in a given cycle both before the generation of said in-focus signal and during said predetermined period of time and to always detect the luminance of said object in real time.

11. A camera body according to claim 7, wherein said photometric means is arranged to have at least two different photometric modes, and one of said modes is selected by means of a change-over switch.

12. A camera body according to claim 11, further comprising start means arranged to forcedly actuate said photometric means in response to the switching action of said change-over switch.

* * * * *

UNITED STATES PATENT AND TRADEMARK OFFICE
CERTIFICATE OF CORRECTION

PATENT NO. : 4,926,204

DATED : May 15, 1990

INVENTOR(S) : Masaharu Kawamura

Page 1 of 2

It is certified that error appears in the above-identified patent and that said Letters Patent is hereby corrected as shown below:

ON THE TITLE PAGE,

[57]  ABSTRACT:

Line 13, "means which" should be deleted.

COLUMN 4:

Line 36, "state" should read --stated--.

COLUMN 7:

Line 14, "a" should read --an--.

COLUMN 10:

Line 45, "A camera" should read --Apparatus--.

UNITED STATES PATENT AND TRADEMARK OFFICE
CERTIFICATE OF CORRECTION

PATENT NO. : 4,926,204

DATED : May 15, 1990

INVENTOR(S) : Masaharu Kawamura

It is certified that error appears in the above-identified patent and that said Letters Patent is hereby corrected as shown below:

COLUMN 12 :

Line 3, "aid" should read --said--.

Signed and Sealed this

Seventeenth Day of November, 1992

*Attest:*

DOUGLAS B. COMER

*Attesting Officer*   *Acting Commissioner of Patents and Trademarks*